United States Patent [19]

Poliak et al.

[11] Patent Number: 4,641,905

[45] Date of Patent: Feb. 10, 1987

[54] CORDSET CLAMP SYSTEM

[75] Inventors: John M. Poliak, East Meadow; Herbert Anker, Little Neck, both of N.Y.

[73] Assignee: Leviton Manufacturing Company, Inc., Little Neck, N.Y.

[21] Appl. No.: 782,381

[22] Filed: Oct. 3, 1985

[51] Int. Cl.⁴ ............................................. H01R 13/59
[52] U.S. Cl. ................................... 339/103 B; 174/65
[58] Field of Search .......... 339/103 R, 103 M, 103 B, 339/105, 107; 174/153 G, 65, 152 R, 153 R; 248/56

[56] References Cited

U.S. PATENT DOCUMENTS

| | | | |
|---|---|---|---|
| 2,952,730 | 9/1960 | Simonds | 339/107 X |
| 4,108,507 | 8/1978 | Reuner et al. | 174/153 G X |
| 4,216,930 | 8/1980 | Rossler et al. | 339/103 B X |
| 4,563,049 | 1/1986 | Thibeault | 339/107 X |

Primary Examiner—Eugene F. Desmond
Attorney, Agent, or Firm—Paul J. Sutton

[57] ABSTRACT

A clamping system for holding an electrical cord to the wall plate of an electrical appliance. The wall plate forms a circular hole in which an externally threaded body having a cord passage is mounted. A flange of the body is positioned against the inner surface of the wall plate. A pair of flexibly movable arm members having opposed teeth extends in an axial direction from the outer end of the body outside the wall plate. A nut member is threaded onto the body so as to draw the flange and the nut member together with the wall plate between them. The nut member presses the teeth of the arm member together into gripping relationship with the cord. The body can be split into semicircular bodies for easy positioning of the cord.

8 Claims, 13 Drawing Figures

CORDSET CLAMP SYSTEM

BACKGROUND OF THE INVENTION

This invention relates generally to clamps for mounting an electrical cordset to the outer wall of a power appliance such as a clothes drier or a cooking range.

The cord that connects electrical wire to a motor in an electrical appliance with a power source must be insulated from the plate, or wall, of the appliances through which the cord passes. Such insulation is accomplished by a mounting clamp that both positions the wire and keeps the wire from the appliance wall, which is generally a conductive metal. In addition, a mounting clamp keeps the cord from being pulled back and forth between the motor and the power source by gripping both the electrical cord and the appliance wall so that the cord will not wear out and allow the wire to pass current to the appliance wall. Such cordset clamps are mounted by the manufacturer of the appliance during assembly.

Typical prior art cordset clamp is a metal clamp manufactured by GAM-PAK PRODUCTS CORP., Hillside, N.J. 07205. This prior art clamp, which is shown as FIG. 1 in the drawings, is made of metal and has two parts, one to grip the appliance wall and the other to grip the cord. The primary problem of the prior art device is that rotary movement of the cord occurs at the cord gripping part of the clamp. Rotary movement of an electrical cord can result in cord fraying and eventual exposure of the electrical wire in the cord.

The present invention contemplates a system for clamping a cordset to an appliance that overcomes the limitations and disadvantages of the prior art by setting forth a cordset clamp that mounts a cordset to an appliance wall so that the cord is prevented from both rotational and lateral movement relative to the clamp.

Accordingly, it is an object of this invention to provide a cordset clamping system that both grips that appliance wall and grips the electrical cord so that both rotary movement and lateral movement of the cord are prevented.

It is another object of this invention to provide a cordset clamping system that includes a mounting body capable of gripping the electrical cord and a nut member capable of being threaded onto the body so as to both grip the appliance wall between the body and the nut member and to simultaneously grip the cord to prevent either rotatable or other movement.

It is another object of this invention to provide a cordset clamping system that includes a mounting body having opposed body portions and external threads and having a pair of flexible clamping arms capable of being pressed about the cord of the cordset by a nut member having internal threads capable of being threaded about the body portions of the body so as to grip the cord within the clamping arms in non-rotatable and non-lateral movement.

The present invention fulfills the above objects and overcomes the limitations and disadvantages of prior art by providing a cordset clamp system for holding an electrical cord to the wall plate of an electrical appliance that comprises the wall plate forming a generally circular aperture; a cylindrical body forming external threads and having an axis and a body diameter slightly smaller than the diameter of the aperture and forming an axial passage adapted to pass the cord, the body having opposed inner and outer ends and being positioned in the aperture; a flange connected to and extending radially outwardly from the body inner end; a pair of arm members flexibly attached to the outer end of the body, the arm members being adapted to grip the cord; and a nut member having opposed inner and outer portions and forming a chamber adapted to contain the body and the arm members and further forming internal threads at the internal portion adapted to mate with the external threads of the body. The nut member is adapted to be mounted to the body so as to grip the wall plate between the inner portion of the nut member and the flange of the body and is also adapted to press the arm members into gripping relationship with the cord at the outer portion of the nut member.

My invention will be more clearly understood from the following description of a specific embodiment of the invention together with the accompanying drawings:

FIGS. 1a and 1b are a perspective views of a prior art cordset clamp which is not the subject of the present invention and is illustrated to give the reader an appreciation of what applicant remembers the prior art to appear like;

Reference is now made to the drawings in which identical or similar parts are designated by the same reference numbers throughout.

Figure 1A:
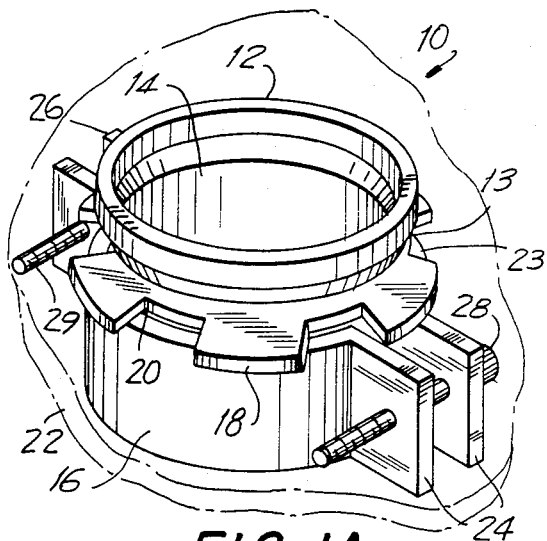
Figure 1B:
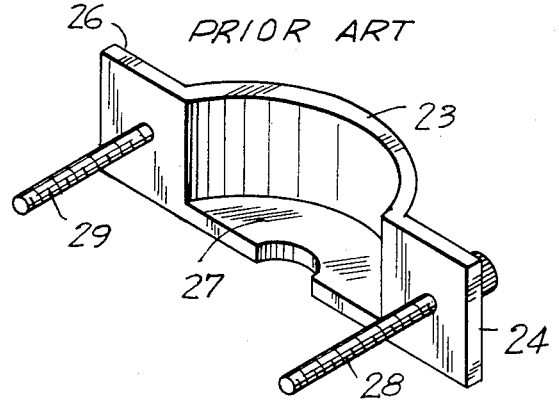

Before proceeding to a description of the invention, a prior art cordset clamp device 10 shown in FIGS. 1A and 1B will be described briefly. Clamp device 10 includes a cylindrical body 12 forming a passage 14 adapted to hold an electrical cord (not shown). Body 12 forms external threads 13. A unitary semi-circular flange 16 extends radially outwardly from the inner rim of body 12. A thin nut 18 formed with grips 20 is threaded upon external threads An opposed half-flange 23 is screw mounted to unitary half-flange 16 so as to form a full flange that presses against one side of wall plate 22. Two pairs 24 and 26 of mating clamping flanges extend from each end of half-flanges 16 and 23. Mating clamping flanges 24 and 26 are each locked together by screws 28 and 29, respectively. A thin, transverse locking plate 27 seen in FIG. 1B extends radially inwardly from the inward end of loose half-flange 23; locking plate 27 is adapted to press against the electrical cord so as to hold the cord in position in passage 14 in accordance with the pressure placed upon the cord by the biting edge of plate 27 as screws 28 and 29 are tightened. It is apparent that an electrical cord held by plate 27 would be relatively free to rotate in passage 14.

Figure 2:
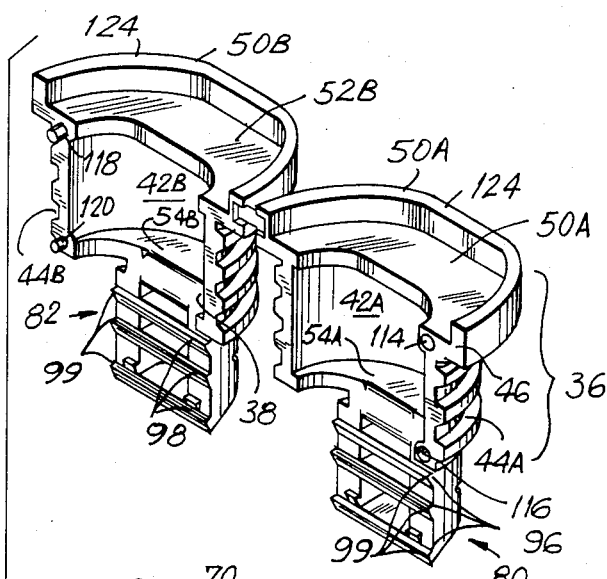
FIG. 2 is an exploded perspective view of the cordset clamp system of this invention.
Figure 2:
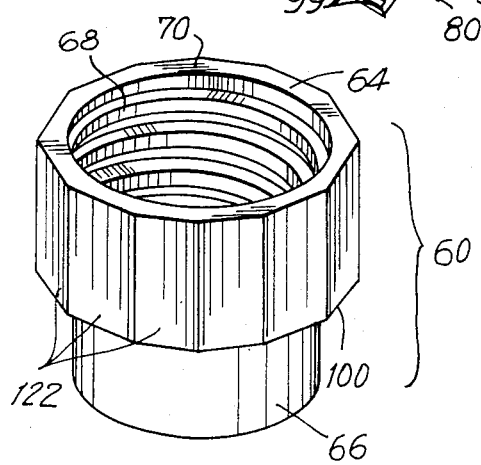
Figure 2:
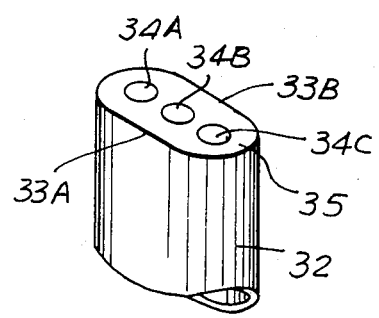
Figure 4:
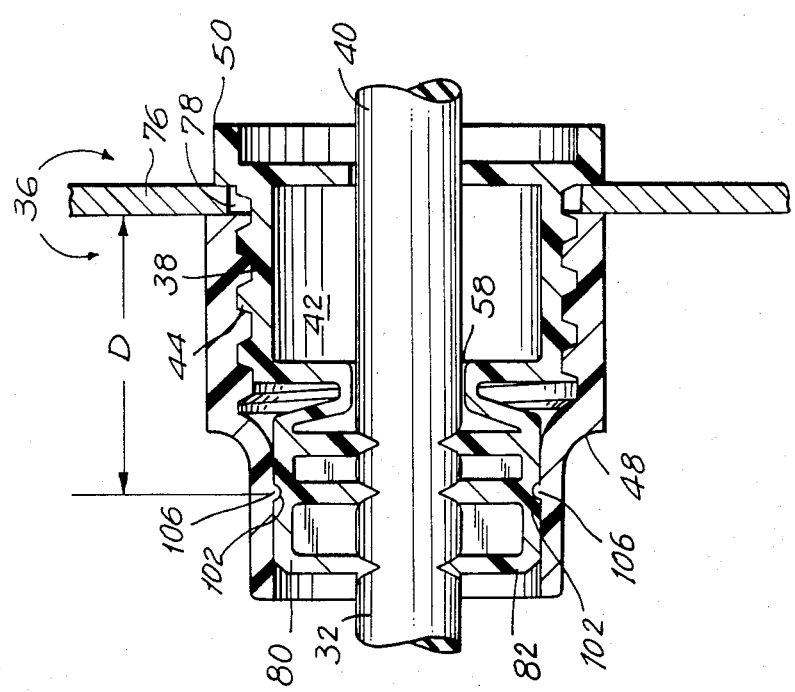
FIG. 4 is a sectional view taken through line 4—4 of FIG. 3.

The present invention is shown in an exploded perspective view in FIG. 2 where a clamping system 30 for holding an electrical cord 32 that extends between the motor of an electrical appliance (not shown) and a source of electrical power. Cord 32 is shown in FIG. 2 as being cut for purposes of exposition. Cord 32 is illustrated as oval with opposed elongated sides 33A and 33B, a configuration common for industrial or heavy-duty cordsets. Cord 32 holds positive, neutral, and negative lead wires 34A, 34B, and 34C, respectively, which are embedded in an insulating material 35, such as rubber. System 30 includes a body 36 including a cylindrical wall 38 having a cylinder axis 40 and that forms a cylindrical chamber 42 around axis 40 adapted to pass cord 32. Cylindrical wall 38 forms external threads 44. Body 36, which is also shown in FIG. 4 in a mounted position, includes inner and outer ends 46 and 48, respectively, which lie in planes transverse to axis 40. A generally circular flange 56 is connected to and extends radically outwardly from inner end 46. Body 36 includes a pair of inner and outer walls 52 and 54, respectively, which lie in planes generally transverse to axis 40. Inner wall 54 is connected to and extends radially inwardly from inner end 46; and outer wall is connected to and extends radially inwardly from outer end 48. Inner and outer walls 52 and 54 form inner and outer oval holes 56 and 58, respectively, which are aligned with one another and are adapted to pass oval cord 32 and to hinder or restrain cord 32 from rotational movement in clamping system 30.

Figure 3:
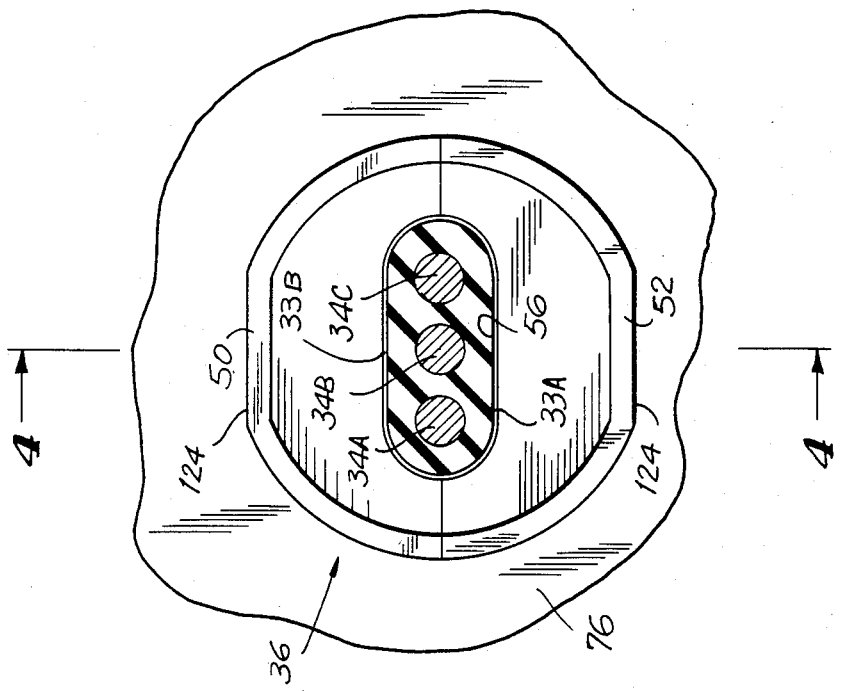
FIG. 3 is an inner end view of the cordset clamp system mounted to an appliance wall.
Figure 5:
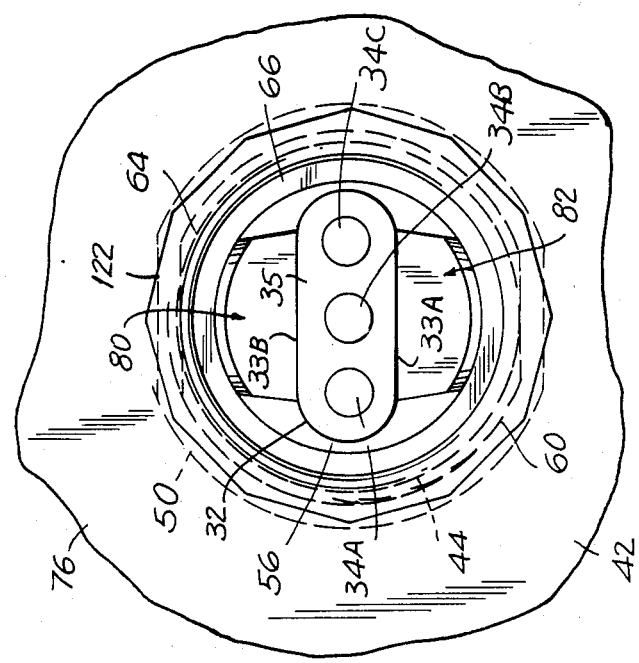
FIG. 5 is a outer end view of the cordset clamp system mounted to an appliance wall.
Figure 6:
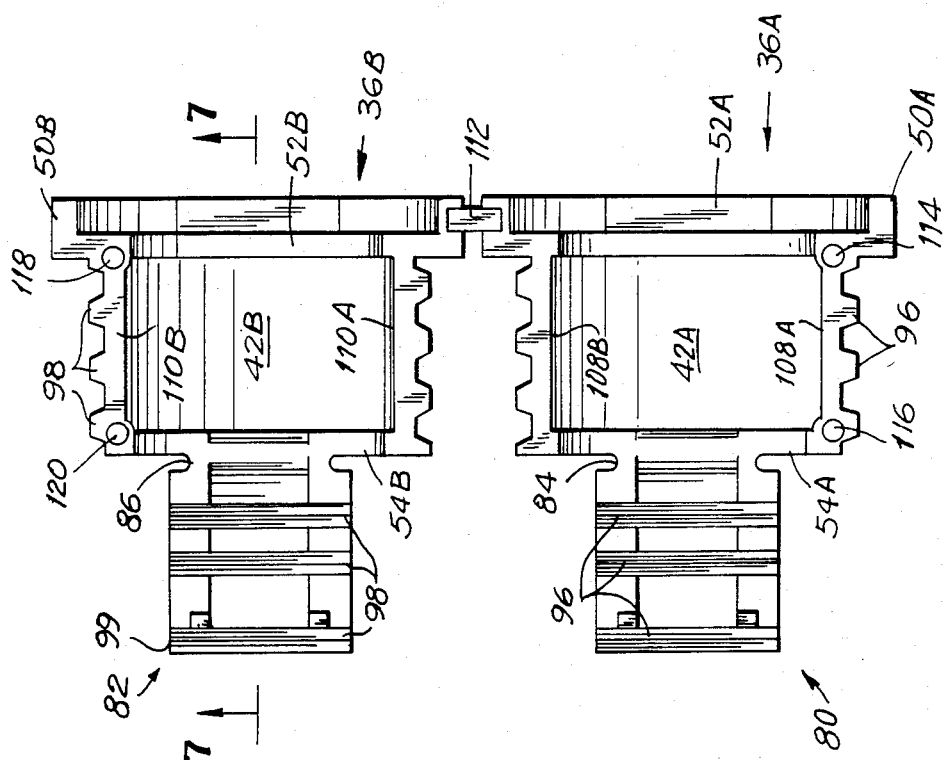
FIG. 6 is a top isolated view of the two portions of the cord-holding body in an open position.
Figure 9:
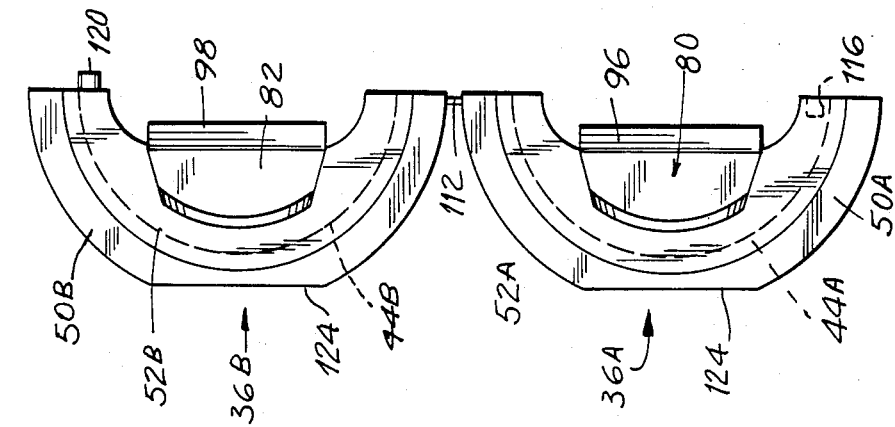
FIG. 9 is an outer end isolated view of the cord-holding body.
Figure 8:
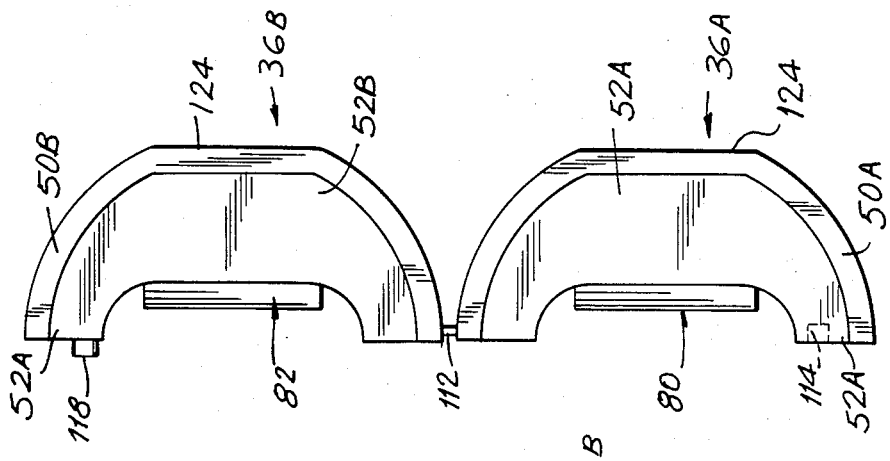
FIG. 8 is an inner end isolated view of the cord-holding body.
Figure 10:
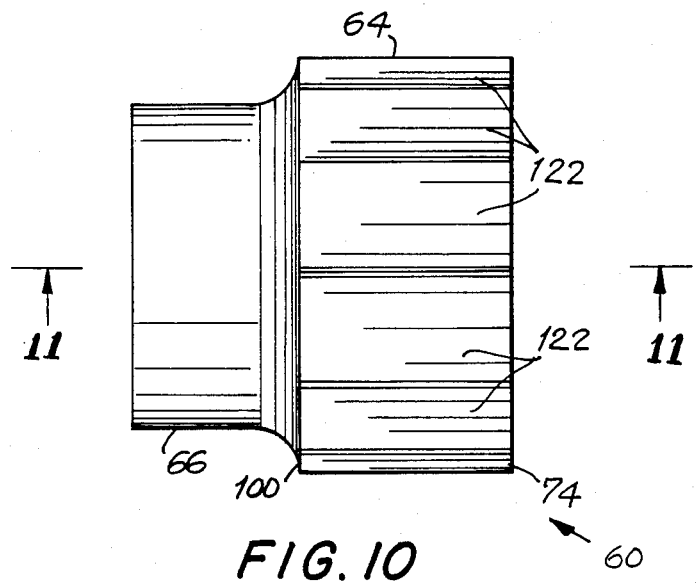
FIG. 10 is a side view of the nut member.
Figure 11:
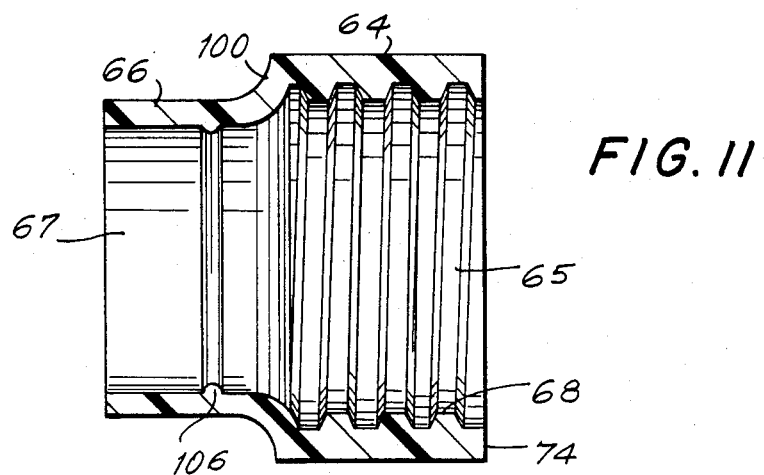
FIG. 11 is a sectional view taken through line 11—11 of FIG. 10.
Figure 12:
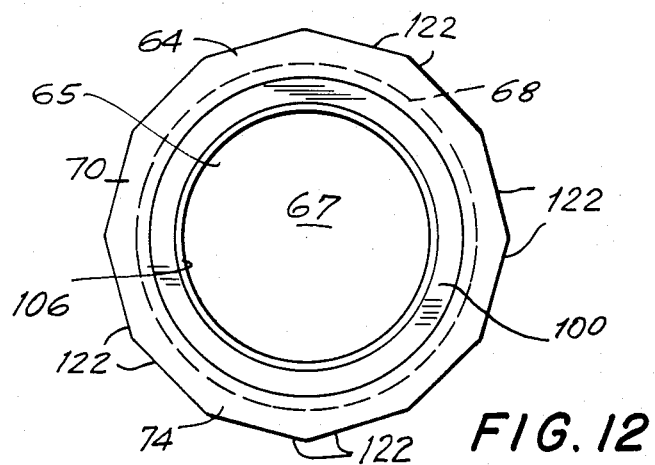
FIG. 12 is an outer end isolated view of the nut member.

System 30 includes a nut member 60 seen mounted in FIGS. 3-5 and in isolation in FIGS. 10-12. Nut member 30 includes an elongated axial chamber that includes inner and outer chamber portions 65 and 67, respectively, defined by inner and outer wall portions 64 and 66, respectively. The inner surface of wall portion 64 forms internal threads 68 adapted to thread onto threads 44 of body 36 as shown in FIG. 4. Inner wall portion 64 includes a cylindrical inner surface that forms internal threads 68. Inner wall portion 64 defines the inner portion of passage 62 and has a circular end rim 74. As shown in FIG. 4, nut member 60 is threaded onto body 36 with an appliance wall plate 76 clamped therebetween. Specifically, wall plate 76 is clamped at flange 50 of body 36 and at end rim 74 of nut member 60, with flange 50 being pressed against the inner surface of wall plate 76 and end rim 74 being pressed against the outer surface of wall plate 76.

Wall plate 76 forms a circular plate hole 78, seen in FIGS. 3 and 4, having a diameter slightly larger than the diameter of body 36, specifically the diameter of body 36 measured across the outside surfaces of external threads 44. Body 36 is positioned through plate hole 78 with flange 50 being generally circular and having a greater diameter than plate hole 78. End rim 74 also has a greater diameter than plate hole 78, preferably being generally of the same diameter as flange 50.

A pair of opposed, spaced tongue, or arm, members 80 and 82 extend in as axial direction outwardly relative to wall plate 76 from outer end 48 of body 36, specifically from outer wall 54 at opposed sides of the longitudinal edges of outer oval hole 58. Arm members 80 and 82 are attached to body 36 by flexible, thin elements 84 and 86, respectively, having elongated dimensions generally lateral to the elongated dimension of oval cord 32. Arm members 82 and 84 have circular and outer sides 88 and 90, respectively, and opposed undersides 92 and 94. Preferably three, generally straight, V-shaped, parallel, spaced teeth 96 extend from underside 92 and three directly opposed teeth 98 extend from underside 94 with the teeth being generally transverse to axis 40. One pair of opposed transverse teeth 96 and 98 are positioned at the outer ends of arm members 82 and 84. Arm members 80 and 82 are flexibly movable between non-gripping and gripping positions, wherein in the non-gripping position the teeth are in a non-gripping relationship with cord 32; and in the gripping position the teeth are pressed into cord 32, particularly into the elongated sides of the oval of cord 32, so as to prevent cord 32 both from being moved axially relative to body 36 or from being rotated relative to body 36.

Figure 7:
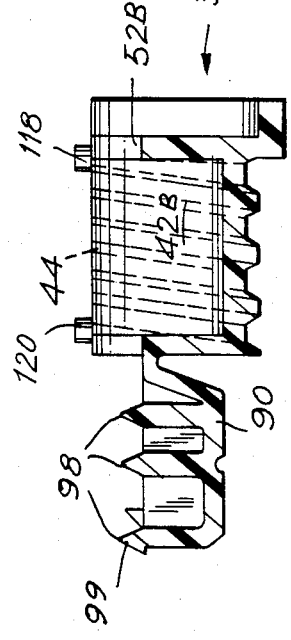
FIG. 7 is a sectional view taken through line 7—7 of FIG. 6.

Cylindrical inner wall 66 of nut member 60 presses upon circular and outer sides 88 and 90 to achieve the gripping position of arm members 80 and 82. A transitional wall portion 100 of nut member 60 is positioned between inner and outer wall portions 64 and 66. Transitional portion 100 forms a transitional chamber that has an inner surface that gradually increases in diameter between the diameter of inner wall portion 64 and the diameter of outer wall portion 66. As nut member 60 is threaded onto body 36, the inner surface of transitional wall portion 100 presses against and outer sides 88 and 90 of arm members 80 and 82 so as to gradually press arm members from their non-gripping position to their grippig position achieved when nut member 60 is fully threaded to body 36 at which position the inner wall of outer wall portion 66 has caused arm members 80 and 82 to achieve their full gripping position with three teeth 96 and three teeth 98 being pressed into insulating material 35 of cord 32 along elongated cord sides 33A and 33B as shown in FIG. 4. Teeth 96 and 98 are V-shaped with top, straight, transverse, sharp biting edges 99 seen in FIG. 7. Circular arm outer sides 88 and 90 form opposed arm grooves 102 and 104, respectively, transverse to axis 40 of body 36; and a circular head 106 extends radially inwardly from the surface of outer wall portions 66 adapted to be positioned in arc grooves 102 and 104 when nut member 60 is fully mounted, or threaded, with body 36 so that nut member 60 is locked into non-rotating association with body 36 in their fully mounted or threaded association.

FIGS. 2 and 6–9 illustrate cylindrical body 36 configured as two semi-cylindrical body portions 36A and 36B with arm members 80 and 82 connected to body portions 36A and 36B, respectively. The designation of details associated with body portions 36A and 36B shown in FIGS. 2 and 6–9 is as before except that "A" or "B" is added to the numeral in accordance with association. The semi-circular configuration of body portions 36A and 36B facilitates the positioning of cord 32 in split body chamber 42A and 42B so that cord 32 can easily be laid there between and also between arm members 80 and 82. The body portions and the arm members are thereupon closed. It is noted that push forcing of cord 32 through chamber 42 and between arm members 80 and 82 is thus avoided. Cylindrical wall 38 includes semi-cylindrical wall portions of wall 38 having paired mating edges 108A and 108B, respectively, and 110A and 110B, respectively. Body portions 36A and 36B include connected flange portions 50A and 50B, respectively, along edges 108A and 108B and 110A and 110B. A flexible strip, on hinge, 112 connects flange portions 50A and 50B at mating edges 108A and 108B.

Mating of body portions 36A and 36B upon their being closed together to form body portion 36 is accomplished by indexing devices that include a pair of spaced holes 114 and 116 formed in mating edge 108A and a pair of spaced locking pins 118 and 120 connected to edge 108B. Pins 118 and 120 are adapted to fit into holes 114 and 116, respectively in locking and aligning relationship when body 36 is ready for mounting in plate hole 78. The locking relationship prevents lateral sliding of body portions 36A and 36B relative one another.

Body 12, arm members 60, and nut member 60 are preferably made of plastic material, the plastic material preferably being either polypropylene or nylon.

Flat edges for gripping with tools are provided for the outer surface of inner portion 65 of nut member 60, shown as octagon edges 122 in FIGS. 2, 5, and 12. A pair of flattened, opposed surfaces 124 provided in the outer surfaces of flange 50 of body 36 is shown in FIGS. 2, 3, 8, and 9.

As shown in FIG. 4, an axial dimension "D" between the outer surface of wall plate 76 and head 106 is predetermined so that exact alignment between head 106 in arc grooves 102 and 104 and wall plate 76 is achieved.

The embodiments of the present invention particularly disclosed herein are presented merely as examples of the invention. Other embodiments, forms, modifications, and variations of the embodiments set forth here of this invention coming within the proper scope of the appended claims will of cause readily suggest themselves to these skilled in the art.

What is claimed is:

1. A clamping system for holding an electrical cord to the wall plate of an electrical appliance, comprising, in combination, said wall plate forming a generally circular aperture, a cylindrical body forming external threads and having an axis and a body diameter slightly smaller than the diameter of said aperture and forming an axial passage adapted to pass said cord, said body having opposed body inner and outer ends, said body being positioned in said aperture, flange means connected to and extending radially outwardly from said body inner end, arm means flexibly attached to said body outer end, said arm means being for gripping said cord, and nut means having opposed inner and outer portions and forming a chamber adapted to contain said body and said arm means and further forming internal threads at said internal portion adapted to mate with said external threads of said body, said nut means being mounted to said body so as to grip said wall plate between said nut means at said inner portion and said body at said flange means and being for pressing said arm means into gripping relationship with said cord at said outer portion.

2. A system according to claim 1, wherein said arm means includes a pair of opposed arm members flexibly attached to and extending in an axial direction from said body outer end, said arm members each having a circular arc outer side and an opposed inner side relative to said cord, and having a plurality of opposed, axially transverse teeth extending transversely inward from said inner side relative to said cord, said arm members being flexibly movable between non-gripping and gripping positions, wherein in said non-gripping position said teeth are in a non-gripping relationship with said cord, and wherein in said gripping position said teeth are pressed into said cord so as to prevent said cord from being moved axially or rotationally relative to said body.

3. A system according to claim 2, wherein said nut means includes a nut member forming said chamber, said inner portion having an inner diameter generally equal to said body diameter and having a circular inner end rim, said inner portion forming said internal threads; said wall plate having an outer surface, said inner end rim being pressed against said outer surface of said wall plate.

4. A system according to claim 3, wherein said outer portion of said nut member has an outer diameter less than said inner diameter of said inner portion, said outer portion forming an outer chamber having a generally cylindrical inner surface adapted to press said arm members towards one another into said gripping position.

5. A system according to claim 1, wherein said body, said arm means, and said nut means are made of a plastic material.

6. a system according to claim 5, wherein said plastic material is polypropylene.

7. A system according to claim 5, wherein said plastic material is nylon.

8. A system according to claim 1, wherein said cord is sized to said arm means.

* * * * *